(12) United States Patent
Musa et al.

(10) Patent No.: US 8,895,478 B2
(45) Date of Patent: Nov. 25, 2014

(54) DEGRADABLE POLYMER COMPOSITIONS AND USES THEREOF

(75) Inventors: Osama M. Musa, Kinnelon, NJ (US); Cuiyue Lei, Wayne, NJ (US)

(73) Assignee: ISP Investments Inc., Wilmington, DE (US)

( * ) Notice: Subject to any disclaimer, the term of this patent is extended or adjusted under 35 U.S.C. 154(b) by 353 days.

(21) Appl. No.: 13/257,751

(22) PCT Filed: Mar. 25, 2010

(86) PCT No.: PCT/US2010/028648
§ 371 (c)(1),
(2), (4) Date: Mar. 9, 2012

(87) PCT Pub. No.: WO2010/114761
PCT Pub. Date: Oct. 7, 2010

(65) Prior Publication Data
US 2012/0157352 A1 Jun. 21, 2012

Related U.S. Application Data

(60) Provisional application No. 61/164,671, filed on Mar. 30, 2009.

(51) Int. Cl.
| | | |
|---|---|---|
| *C09K 8/52* | (2006.01) | |
| *C09K 8/24* | (2006.01) | |
| *C08F 8/12* | (2006.01) | |
| *C08G 81/02* | (2006.01) | |
| *C08F 226/06* | (2006.01) | |

(52) U.S. Cl.
CPC ............... *C08F 8/12* (2013.01); *C08G 81/027* (2013.01); *C08F 226/06* (2013.01)
USPC ........................................... 507/118; 507/90

(58) Field of Classification Search
None
See application file for complete search history.

(56) References Cited

U.S. PATENT DOCUMENTS

| | | | | |
|---|---|---|---|---|
| 4,395,524 A | * | 7/1983 | Emmons et al. ........... 526/307.2 |
| 4,784,653 A | | 11/1988 | Bolton et al. | |
| 4,913,824 A | * | 4/1990 | Kneller ........................ 210/701 |
| 6,319,971 B1 | * | 11/2001 | Kelland et al. ................ 524/379 |
| 2005/0215740 A1 | * | 9/2005 | Nakata et al. ................. 526/217 |
| 2006/0205603 A1 | * | 9/2006 | Colle et al. ..................... 507/90 |
| 2006/0281849 A1 | * | 12/2006 | Johnson ........................ 524/492 |

* cited by examiner

Primary Examiner — Susannah Chung
Assistant Examiner — Kumar R Bhushan
(74) Attorney, Agent, or Firm — William J. Davis

(57) ABSTRACT

The invention relates to novel polymers derived from: (A) at least one N-vinyl amide-based unit and/or at least one acrylamide-based unit, and (B) at least one unit comprising: (i) at least one hydroxyl group, and/or (ii) at least one functional group convertible to a hydroxyl group wherein at least one group is converted to hydroxyl functionality in the final polymer product, wherein the polymer comprises at least one ester group. The polymers and compositions are used in oilfield applications, such as an inhibitor of gas hydrates and/or a kinetic inhibitor of gas hydrates. The polymer can assume alternating, block, and/or random configurations of the repeating units, with at least one ester group.

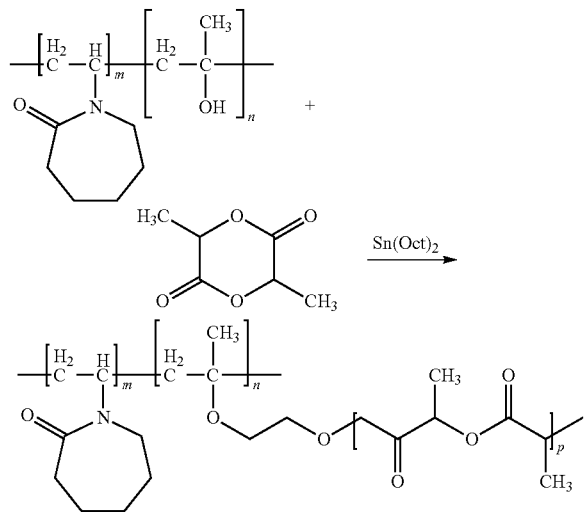

27 Claims, No Drawings

DEGRADABLE POLYMER COMPOSITIONS AND USES THEREOF

FIELD OF THE INVENTION

Disclosed herein are novel degradable polymers derived from: (A) at least one N-vinyl amide-based unit and/or at least one acrylamide-based unit, and (B) at least one unit comprising:

(i) at least one hydroxyl group, and/or (ii) at least one functional group convertible to a hydroxyl group wherein at least one group is converted to hydroxyl functionality in the final polymer product, and wherein the polymer comprises at least one ester group, and wherein the polymer is not poly(N-vinyl-2-pyrrolidone)-block-polyester copolymers or other diblock and triblock copolymer consisting of poly(N-vinyl-2-pyrrolidone) as one block.

Also described are compositions comprising the polymers.

Due to degradability attributes, the polymers and compositions thereof may be employed in any number of applications, including, but not limited to: adhesive, agriculture, cleaning, coating, dental, encapsulation, imaging, household/industrial/institutional, medical, membrane, oilfield, oral care, packaging, personal care, pharmaceutical, printing, and veterinary applications.

In preferred embodiments, the polymers and compositions thereof are used in oilfield applications, for example, to prevent, inhibit, and/or retard the formation of gas hydrates during the transport of a fluid, especially a fluid comprising water and one or more hydrocarbons.

DESCRIPTION OF THE RELATED ART

Given a renewed focus on the environment, degradable materials, including degradable polymers, are receiving much attention. Such interest is focused on their replacement for less-degradable counterparts, as well as new functional properties they provide. Research of these materials can be found in almost every field, including agriculture, dental, imaging, industrial chemicals, medical, personal care, pharmaceutical, printing, and veterinary arts.

The need for degradable materials can be illustrated by the volume of paper, plastic, and composite materials used and then disposed daily. Materials that do not breakdown into relatively less harmful constituent units may unnecessarily consume landfill capacity, or contribute to land, air, and/or water contamination. Yet, the need for degradable materials is not limited to consumer paper and plastics, as a wide range of substances may be discharged into the environment. Thus, there exists the need for materials that provide less harmful effects on the environment while approaching or surpassing functionality compared to their less-degradable counterparts.

Degradable substances find particular interest in many fields of study, including (but not restricted to) biomedical applications, where they may be implanted, inserted, sutured, or otherwise employed inside or on living organisms, such as man or other mammals. Materials that degrade and/or deteriorate into harmless constituents may be preferred over persistent materials, like metals and non-degradable plastics, from patient compliance and health perspectives.

Many techniques have been pursued to design degradability into polymers, including methods based on poly(glycolide), and poly(lactide), which may be derived from their cyclic counterparts. Representative patents in these arts include: U.S. Pat. Nos. 7,262,253; 7,282,216; 7,361,726; 7,361,727; and Eguiburu, J., et al., (1996), all of which are hereby incorporated in their entirety by reference. The disclosed compositions generally describe copolymers and/or diblock polymers of hydroxy-terminated N-vinyl-2-pyrrolidone.

Specific biodegradable compositions are taught in the prior art based on cyclic ester grafts. For example, water-soluble poly(vinyl alcohol) grafted with lactic acid and glycolic acid is known in the prior art (Carlotti, et al., 2001), as is a poly (ethylene-co-vinyl alcohol) with grafted polycaprolactam units (Jiang, et al., 2002). Poly(N-vinyl-2-pyrrolidone)-block-polyester copolymers are disclosed in U.S. Pat. No. 7,262,253, and are directed for pharmaceutical applications. Such polymers are derived from poly(vinyl pyrrolidone) with a terminal hydroxyl group.

In addition to medical and veterinary arts, degradable materials also are needed in industrial applications. For example, vinyl amide-based polymers serve several important roles, and in one application, as kinetic gas hydrate inhibitors. It is well known that the presence of water in the hydrocarbon-containing line can facilitate the formation of gas hydrate crystals, which can block the conduit and/or compromise the integrity of the construction materials. Lower molecular weight hydrocarbon gases such as methane, ethane, propane, butane, and isobutane are especially prone to the formation of gas hydrates. Elevated pressures and low temperatures aide interactions between the dissolved hydrocarbon(s) and water. Such process conditions are frequently encountered, especially during deep sea and arctic drilling, causing these molecules to nucleate, crystallize, and produce gas hydrate crystals. The formation, persistence, and accumulation of gas hydrates during drilling and transport operations to the processing facility may result in large pressure drops and/or extensive cost and downtime if they impede fluid transport.

Methods have been developed to address these problems, and can be categorized into four general areas: (1) water removal from the transport line, (2) thermal approaches to maintain and/or create a temperature profile inside the transport line so that gas hydrate formation is unfavorable, (3) thermodynamic chemical (antifreeze compounds) addition to decrease the gas hydrate crystallization temperature, and (4) addition of kinetic inhibitors to retard, delay, or slow gas hydrate nucleation kinetics and retard, delay, or slow their agglomeration after they form.

However, these methods are prone to problems, and, with the exception of water removal, involve the addition of chemicals that may enter the environment. Additionally, there may be flammability concerns, e.g., the addition of methanol as a thermodynamic inhibitor, and there is always a demand to minimize costs. Thus, there is the need for improved compositions and methods of maintaining pipelines free of gas hydrate crystal, especially compositions that exhibit chemical and/or biodegradability.

The prior art discloses gas hydrate inhibitors, for which polymeric compositions have proved beneficial. Representative compositions include those disclosed in the following U.S. Pat. Nos. 4,915,176; 5,420,370; 5,432,292; 5,639,925; 5,723,524; 6,028,233; 6,093,863; 6,096,815; 6,117,929; 6,451,891; and 6,451,892. Gas hydrate inhibitors based on N-vinyl amide chemistries have been especially useful. Patents disclosing vinyl amides compositions used for gas hydrate inhibition include: U.S. Pat. Nos. 5,432,292; 5,723, 524; 5,874,660; 6,028,233; 6,096,815; 6,117,929; 6,180,699; 6,194,622; 6,242,518; 6,281,274; 6,451,892; and 6,544,932.

Clathrate inhibitors comprising acrylamide polymers are disclosed in US patent application 2006/0058449 and 2006/0205603.

Indeed, many of these materials have demonstrated their usefulness in commercial products and applications. However, with a growing sense of environmental awareness, there remains a great need for materials, including gas hydrate inhibitors, that degrade either by chemical, biological, and/or other mechanisms. These degradability features are absent in the gas hydrate inhibitors currently available.

Accordingly, it is the object of the present invention to provide polymers that degrade in significantly less time than required by conventional polymers. Due to these properties, the polymers provided by this invention find application in many fields, including, but not limited to: adhesive, agriculture, cleaning, coating, dental, encapsulation, imaging, household/industrial/institutional, medical, membrane, oilfield, oral care, packaging, personal care, pharmaceutical, printing, and veterinary applications.

In one embodiment, the polymers address the need for effective gas hydrate inhibitors that also are degradable.

SUMMARY OF THE INVENTION

Novel degradable polymers have been discovered being derived from: (A) at least one N-vinyl amide-based unit and/or at least one acrylamide-based unit, and (B) at least one unit comprising:
(i) at least one hydroxyl group, and/or
(ii) at least one functional group convertible to a hydroxyl group wherein at least one group is converted to hydroxyl functionality in the final polymer product, and
wherein the polymer comprises at least one ester group, and wherein the polymer is not poly(N-vinyl-2-pyrrolidone)-block-polyester copolymers or other diblock and triblock copolymer consisting of poly(N-vinyl-2-pyrrolidone) as one block.

Optional polymerizable units may be synthesized into the polymer and are contemplated.

In preferred but non-limiting embodiments, polymers of this invention and compositions thereof find application in oilfield applications, serving as (but not limited to): anti-agglomerants, emulsifiers, de-emulsifiers, gas hydrate inhibitors, kinetic hydrate inhibitors, shale swelling inhibitors, and/or scale inhibitors. In especially preferred embodiments, the polymers and compositions thereof are used as inhibitors of gas hydrates and/or kinetic inhibitors of gas hydrates.

It may be desirable that the composition (with or without any reaction solvent) be water dispersible and/or water soluble. In this case it is preferable that the water-dispersible and/or water-soluble solvent comprise a hydroxyl group, e.g., an alcohol, a glycol ether, ethylene glycol, or a polar aprotic solvent, and/or blends thereof. In especially preferred embodiments, the composition comprises a delivery solvent selected from the group consisting of: 2-butoxyethanol, ethanol, ethylene glycol, poly(ethylene glycol), 1-propanol, 2-propanol, and water, and blends thereof. An exemplary reaction and/or delivery solvent comprises 2-butoxyethanol.

DETAILED DESCRIPTION OF PREFERRED EMBODIMENTS OF THE INVENTION

Novel degradable polymers have been discovered being derived from: (A) at least one N-vinyl amide-based unit and/or at least one acrylamide-based unit, and (B) at least one unit comprising at least one hydroxyl group and/or at least one unit comprising a functional group convertible to a hydroxyl group wherein at least one group has been converted to hydroxyl functionality, wherein the polymer comprises at least one ester group, and wherein the polymer is not poly(N-vinyl-2-pyrrolidone)-block-polyester copolymers or other diblock and triblock copolymer consisting of poly(N-vinyl-2-pyrrolidone) as one block.

Multiple methods exist for synthesizing the polymers. In particular, there is considerable flexibility with regard to (B), as the —OH group may exist prior to polymerization, or may be obtained after polymerization from groups that can be converted to hydroxyl functionality. A more informative description of these methods is presented later in this section.

Likewise, flexibility is provided for producing the at least one ester group, which also is provided later in this section.

The polymers of this invention may be synthesized with or without solvent, wherein the reaction system may comprise any number of solvents suitable for conducting the reactions. Optionally, but not necessary, the reaction solvent may be replaced during and/or after the reactive steps, and replaced by a different solvent. When the synthesized polymers are employed in the field of use, the delivery solvent system may comprise one or more of the reaction solvents, or the reaction solvent system may be replaced entirely by a delivery solvent.

Such polymers and compositions thereof may serve a number of fields, especially where degradability is a desired feature. These fields include, without limitation: adhesive, agriculture, cleaning, coating, dental, encapsulation, imaging, household/industrial/institutional, medical, membrane, oilfield, oral care, packaging, personal care, pharmaceutical, printing, and veterinary applications.

In one embodiment, the compositions comprising the described polymers find application as gas hydrate inhibitors for oilfield treatment. Within this application (and others that are water-based), the composition may comprise a water dispersible and/or water-soluble delivery solvent system, as it is believed to aide in the delivery and efficacy of the polymer composition.

Also provided are methods and compositions for preventing, retarding, and/or inhibiting gas hydrate formation and/or agglomeration during the transport and/or storage of a fluid comprising water and a hydrocarbon by contacting the fluid with an effective amount of a composition of this invention.

However, the polymers of this invention are not limited to compositions comprising water dispersible and/or water-soluble solvents. Alternatively, the polymer products and compositions made thereof, may comprise any solvent system and additional ingredients as appropriate, and take any form, including as a paste, semi-solid, solid and/or solid-like form (e.g., beads, filaments, films, foams, granules, powders, sheets, and threads).

DEFINITIONS

As used herein, the following terms have the meanings set out below:

The term "comprising" encompasses the more restrictive terms "consisting essentially of" and "consisting of."

All percentages, ratio, and proportional used herein are based on a weight basis unless other specified.

The phrases "gas hydrate inhibitor" refers to compositions that prevent or retard the formation of gas hydrates, or reduce the tendency for said hydrates to agglomerate during storage and hydraulic transport of hydrocarbon-based fluids comprising water.

The term "halide" refers to chloro, bromo, iodo and fluoro, and is preferably bromo or chloro.

The term "monomer" refers to the repeat units comprising a polymer. A monomer is a small molecule that chemically bonds to other monomers to form a polymer.

The term "personal care composition" refers to such illustrative nonlimiting compositions as skin, sun, oil, hair, cosmetic, and preservative compositions, including those to alter the color and appearance of the skin. Potential personal care compositions include, but are not limited to, polymers for increased flexibility in styling, durable styling, increased humidity resistance for hair, skin, and color cosmetics, sun care water-proof/resistance, wear-resistance, and thermal protecting/enhancing compositions.

The term "polymer" refers to a large molecule (macromolecule) composed of repeating structural units (monomers) connected by covalent chemical bonds.

The subscripts "m," "n," and "p" as used herein with regard to chemical structures refer to integers commonly used in polymers to denote the number of repeating units of each monomer. In general, m, n, and p in the present invention are independently selected such that the polymer molecular weight is from about 500 atomic mass units (amu) and 5,000,000 amu.

N-Vinyl Amide-Based Unit and/or Acrylamide-Based Unit

The polymers described by this invention are derived in part from (A) at least one N-vinyl amide-based unit and/or at least one acrylamide-based unit. Both acyclic and cyclic constructs of these units are contemplated, which may be presented in the polymer in any type of arrangement, including, but not limited to: alternating, block, branched, linear, periodic, and/or random arrangements.

N-Vinyl Amide-Based Units

Examples of acyclic N-vinyl amides include, but are not limited to: N-vinyl formamide and its derivatives [e.g., N-(2,2-dichloro-vinyl)-propionamide, N-ethenyl acetamide, cis-N-propenyl acetamide, N-vinyl acetamide, N-vinyl-N-methyl acetamide, and N-vinyl-N,N-propyl propionamide].

Cyclic N-vinyl amides, also known as vinyl lactams, may be used, either alone or in combination with acyclic N-vinyl amides. In preferred embodiments, the cyclic N-vinyl amide contain from 4 to 13 total carbon atoms.

Examples of cyclic vinyl amides include, but are not limited to: N-vinyl-2-pyrrolidone; N-vinyl piperidone; N-vinyl-2-caprolactam; N-vinyl-3-methyl pyrrolidone; N-vinyl-4-methyl pyrrolidone; N-vinyl-5-methyl pyrrolidone; N-vinyl-3-ethyl pyrrolidone; N-vinyl-3-butyl pyrrolidone; N-vinyl-3,3-dimethyl pyrrolidone; N-vinyl-4,5-dimethyl pyrrolidone; N-vinyl-5,5-dimethyl pyrrolidone; N-vinyl-3,3,5-trimethyl pyrrolidone; N-vinyl-5-methyl-5-ethyl pyrrolidone; N-vinyl-3,4,5-trimethyl-3-ethyl pyrrolidone; N-vinyl-6-methyl-2-piperidone; N-vinyl-6-ethyl-2-piperidone; N-vinyl-3,5-dimethyl-2-piperidone; N-vinyl-4,4-dimethyl-2-piperidone; N-vinyl-6-propyl-2-piperidone; N-vinyl-3-octyl piperidone; N-vinyl-7-methyl caprolactam; N-vinyl-7-ethyl caprolactam; N-vinyl-4-isopropyl caprolactam; N-vinyl-5-isopropyl caprolactam; N-vinyl-4-butyl caprolactam; N-vinyl-5-butyl caprolactam; N-vinyl-4-butyl caprolactam; N-vinyl-5-tert-butyl caprolactam; N-vinyl-4-octyl caprolactam; N-vinyl-5-tert-octyl caprolactam; N-vinyl-4-nonyl caprolactam; N-vinyl-5-tert-nonyl caprolactam; N-vinyl-3,7-dimethyl caprolactam; N-vinyl-3,5-dimethyl caprolactam; N-vinyl-4,6-dimethyl caprolactam; N-vinyl-3,5,7-trimethyl caprolactam; N-vinyl-2-methyl-4-isopropyl caprolactam; N-vinyl-5-isopropyl-7-methyl caprolactam; and blends thereof.

To inhibit gas hydrates in oilfield applications, it may be advantageous, but not required, that the N-vinyl amide unit comprise a cyclic N-vinyl amide, and, in particular, comprise N-vinyl-2-pyrrolidone or its derivatives, and/or N-vinyl-2-caprolactam and/or its derivatives, as these N-vinyl amides have been shown effective gas hydrate inhibitors. Especially preferred is N-vinyl-2-caprolactam in gas hydrate inhibitor polymers and compositions.

For medical and/or pharmaceutical applications, low toxicity compositions of this invention are highly preferred. For example, N-vinyl-2-caprolactam and N-vinyl-2-pyrrolidone may be a favored due to its biocompatibility.

Acrylamide-Based Units

In addition to, or in place of the at least one N-vinyl amide-based unit, the polymer may be derived in part from at least one acrylamide-based unit. Both acyclic and cyclic constructs of acrylamide-based units are contemplated.

Examples of acyclic acrylamide-based units include, but are not limited to: acrylamide and its derivatives (e.g., N-butoxymethylacrylamide; N,N-dibutylacrylamide; N-butylacrylamide; diacetoneacrylamide; N—(N,N-dimethylamino)ethyl acrylamide; N,N-diethylacrylamide; N,N-dimethylacrylamide; N-dodecylmethacrylamide; N-ethylacrylamide; N-ethylmethacrylamide; N-isopropylacrylamide; N-isopropylmethacrylamide; N-tetramethylacrylamide; N-methylolacrylamide; N-methyl acrylamide; N-octadecylacrylamide; N-octylacrylamide; N-phenylacrylamide; and trichloroacrylamide).

Similarly, examples of cyclic acrylamide-based units are known, and include, without restriction: N-acryloyl piperidone, N-acryloyl pyrrolidone, ethyl acryloyl pyrrolidone, methyl acryloyl pyrrolidone, N-acryloyl caprolactam, ethyl acryloyl caprolactam, methyl acryloyl caprolactam, N-cyclohexylacrylamide, N-cyclopentylacrylamide, and blends thereof.

Unit Comprising Hydroxyl Group

In addition to element (A), polymers of this invention also are derived in part from (B) at least one unit comprising:
  (i) at least one hydroxyl group, and/or
  (ii) at least one functional group convertible to a hydroxyl group wherein at least one group is converted to hydroxyl functionality in the final polymer product.

This section describes the multiple methods that are available to the polymer chemist to incorporate the at least one hydroxyl-containing unit into the polymer. In one embodiment of the invention, (B) is a polymerizable unit. A description of these chemistries and reactions that follow can be found in a text on organic chemistry, such as *Organic Chemistry* by Morrison and Boyd (Prentice-Hall International, 1992), which is incorporated herein in its entirety by reference.

A polymerizable unit can be identified by the presence of a carbon-carbon double bond. Many examples of such polymerizable units are known, and include those based on the following chemistries: allyl, cinnamyl, fumaryl, (meth)acryl, stryenyl, and vinyl. Other families of polymerizable units can be identified by those skilled in the art.

By a first method, the polymerizable unit comprises at least one hydroxyl group that exists prior to the polymerization. Examples of suitable polymerizable units within this category include, but are not limited to: hydroxyacrylate-based units, (e.g., polyethylene glycol acrylate, polyethylene glycol methacrylate, 2-hydroxyethyl acrylate, hydroxyethyl ethacrylate, hydroxyethyl methacrylate, 3-hydroxypropyl methacrylate, and 3-hydroxypropyl acrylate). All molecular weights of such units are contemplated. However, this is but one method to impart the necessary hydroxyl group into the polymer.

By a second method, the polymerizable unit comprises at least one functional group that can be converted to a hydroxyl group, e.g., by chemical reaction. Many reactions of this category are known to one skilled in the art, and include, without limitation:

(1) hydrolysis of vinyl esters,
(2) alcoholysis of vinyl esters,
(3) aminolysis of vinyl esters,
(4) hydrolysis of alkenyl halides,
(5) reduction of vinyl carboxylic acids, vinyl ketones and vinyl aldehydes, and
(6) ring opening and nucleophilic addition of epoxides.

It is outside the scope of this invention to list every method by which a hydroxyl group can be provided subsequent to polymerization. Instead, the above methods are meant to represent several techniques, and emphasize the diversity of chemistries that achieve the result.

In examples of the above categories (1)-(4), the polymerizable unit comprises vinyl esters and/or alkenyl halides that are hydrolyzed, alcoholyzed, or aminolyzed to yield at least one hydroxyl group. Examples of vinyl acetate-based units are recognized by one skilled in the art, and include, without limitation: 2-acetoxy-2-butene, 2-acetoxy-3-methyl-2-butene, ethyl vinyl acetate, isopropenyl acetate, methyl vinyl acetate, (pent-2-en-3-yl)acetate, vinyl acetate, vinyl hexanoate, vinyl octanoate, vinyl propionate, vinyl n-valerate, and blends thereof.

Examples of alkenyl halides include, without limitation: 1-chloro-1-butene; 1-chloro-2-butene; 3-chlorocrotonic acid; 3-chloro-methacrylic acid; 1-chloro-2-pentene; 2-chloro-2-butene; 2-chloro-3-methyl-butene; 2-chloro-3-hexene; 2-chloro-2-pentene; 4-chloro-prop-3-en-2-one; 1,2-dichloroethylene; trichloroethylene; vinyl chloride; and vinylidene chloride, and their bromine and iodine analogues, and blends thereof.

All ranges of hydrolysis, alcoholysis and aminolysis are contemplated, meaning the conversion from ester and/or halide group to hydroxyl group varies from the smallest effective level (typically about 0.1% conversion) to 100% conversion.

Preferred embodiments of the invention synthesize the at least one hydroxyl group through the polymerization of vinyl acetate followed by hydrolysis or alcoholysis. Examples of this synthesis method are provided in the Examples section.

In category (5), the hydroxyl group may be synthesized by polymerization and subsequent reduction of vinyl carboxylic acids, vinyl ketones, and vinyl aldehydes.

A carboxylic acid functional group can be reduced an alcohol through a reducing agent (e.g., lithium tetrahydridoaluminate). However, because lithium tetrahydridoaluminate may react violently with water, it may be preferred to perform the reduction anhydrously. In such cases, the desired hydroxyl group is created by final treatment with acid, e.g., dilute sulfuric acid. Examples of vinyl carboxylic acids include, but are not limited to: acrylic acid; 2-butenoic acid; cinnamic acid; 2,3-dimethylacrylic acid; 3,3-dimethylacrylic acid; 2,3-dimethyl-2-butenoic acid; 2-ethylacrylic acid; 2-ethyl-2-butenoic acid; fumaric acid; methacrylic acid, 2-pentenoic acid, 4-pentenoic acid, and blends thereof.

Likewise, a ketone functional group can be reduced to hydroxyl functionality through a Grignard reaction followed by reaction with water. Alternatively, the ketone functional group is reacted with a reducing reagent (e.g., lithium tetrahydridoaluminate) as described above for carboxylic acid conversion. Examples of vinyl ketones include, but are not limited to: ethyl vinyl ketone; 2-hepten-4-one; hex-3-ene-2-one; 4-hexen-3-one; 3-methyl-3-penten-2-one; 4-methyl-3-penten-2-one; 5-methyl-1-hexen-3-one; methyl vinyl ketone; 3-penten-2-one; propyl vinyl ketone; and blends thereof.

The reactive methods described for vinyl ketones also can be employed for converting aldehydes to hydroxyl functionality. Examples of vinyl aldehydes that can be polymerized include, but are not limited to: but-2-enal; 2-butenedial; 3-butyn-1-al; cinnamic aldehyde; 2-methyl-2-butenal; 2-methylene butyraldehyde; 2-methyl-2-pentenal; 2-methyl-2-propenal; 3-methylbut-2-enal; 2-pentenedial; prop-2-enal, and blends thereof.

By category (6), the hydroxyl group of the polymer may be derived in part through epoxide ring opening and addition by either acid- or base-catalyzed nucleophilic addition/hydrolysis/reduction. Examples of epoxides include, but are not limited to: 1,2-epoxybutane; 2,3-epoxybutane; ethylene oxide; propylene oxide; isobutylene oxide; and blends thereof.

Alternatively, (B) may be incorporated into the polymer via one or more solvent adducts. Without attempting to exhaust the list of potential techniques, the at least one hydroxyl group may be incorporated into the polymer via a solvent adduct during the polymerization reaction(s). It is preferred that by this method, the reaction solvent comprise a hydroxyl group. Thus, suitable reaction solvents for use by this method include, but are not limited to: alcohols (e.g., 1-butanol, 2-butanol, ethanol, ethylene glycol, methanol, 1-propanol, 2-propanol, and propylene glycol), and glycol ethers (e.g., 2-methoxyethanol, 2-butoxyethanol, 2-isopropoxyethanol). Less preferably, the solvent adduct comprises a functionality that is converted to the hydroxyl group, e.g., as described above for acetate, aldehyde, carboxylic acid, and ketone functional groups.

When (B) is provided by one or more solvent adducts, the polymer may be a hydroxyl-terminated polymers, such as those compositions described by U.S. Pat. No. 7,262,253, which is incorporated herein in its entirety by reference. The only limitation is that the polymers of the current invention are not poly(N-vinyl-2-pyrrolidone)-block-polyester copolymers or other diblock and triblock copolymer consisting of PVP as one block. However, poly(N-vinyl-2-caprolactam)-block-polyester copolymers or other diblock and triblock polymers consisting of poly(N-vinyl-2-caprolactam) are contemplated, especially as inhibitors of gas hydrates.

The number and arrangement of the hydroxyl-comprising unit are not restricted, as they may exist in alternating, block, branched, linear, periodic, and/or random arrangements, or occupy terminal positions.

Producing the Ester Unit

The specification thus far has described polymers derived from (A) at least one N-vinyl amide-based unit and/or at least one acrylamide-based unit, and (B) at least one unit comprising a hydroxyl group and/or at least one group convertible to a hydroxyl group. Additionally, the synthesized polymer comprises at least one ester group.

Preparative methods to synthesize ester functionality onto a hydroxyl group are well known and appreciated in the art, and include, without restriction:

the alcoholysis of acyl halides and acid anhydrides,
the conversion of carboxylic acids,
the acid catalysis of nitriles,
the transesterification of esters, and
the hydrolysis and grafting of cyclic monoesters and cyclic diesters.

It preferred embodiments, the at least one ester group is synthesized by the final method, viz., through the hydrolysis and grafting of cyclic monoesters and/or cyclic diesters.

Acyl Halide and Acid Anhydrides

The ester unit of the polymer may be attained by reacting the hydroxyl group(s) of the polymer with acyl chlorides and acid anhydrides in a reaction known as alcoholysis. Because aromatic acid chlorides are less reactive than aliphatic acid chlorides, reactions with the former may be performed using the Schotten-Baumann technique, wherein the acid chloride is added in portions to a mixture of the hydroxyl compound and a base (e.g., sodium hydroxide). Examples of acyl halides include, but are not limited to: acetyl chloride, benzoyl chloride, butyryl chloride, diethyl acetyl chloride, ethanolyl chloride, isobutyryl chloride, 2-methyl butanoyl chloride, 2-methyl pentanoyl chloride, propanoyl chloride, stearoyl chloride, and blends thereof.

Alcoholysis also can be employed to graft acid anhydrides to form an ester unit in the polymer product. Typically, these reactions proceed at room temperature more slowly than for acyl chlorides, and the reacting system may be heated to speed the reaction. Examples of acid anhydrides include, but are not limited to: acetic anhydride, ethanoic anhydride, glutaric anhydride, phthalic anhydride, propanoic anhydride, succinic anhydride, and blends thereof.

Carboxylic Acids

Carboxylic acids may be converted in a number of ways to produce the ester unit in the polymer. For example, a carboxylic acid first may be converted in a two-step process, first to its acyl chloride, and then to the ester unit via alcoholysis (as described above). Alternatively, a one-step, direct esterification method may be employed, wherein the intermediate polymer product is heated with a carboxylic acid in the presence of an acid catalyst, typically, but not limited to, a concentrated acid (e.g., sulfuric acid). In order to increase the product yield, it may be preferable to remove the ester-containing product, e.g., through reflux heating and distillation.

Examples of suitable carboxylic acids include, but are not limited to: acrylic acid, ethanoic acid, 2-ethylbutanoic acid, 2-ethylpantanoic acid glycolic acid, lactide acid, methanoic acid, 2-methylbutanoic acid, propanoic acid, and blends thereof. Glycolic acid and lactide acid are especially preferred carboxylic acids to produce the polymer's at least one ester unit. The use of salts of carboxylic acids (e.g., sodium ethanoate) also is contemplated.

Nitriles

The Pinner reaction can be used to create a ester functional group following the reaction of a nitrile with a hydroxyl group of the polymer composition. The Pinner reaction is an organic reaction of a nitrile with an alcohol under acid catalysis, e.g., hydrochloric acid. Hydrochloric acid salt of an imino ester or an alkyl imidate are produced in a sequence of nucleophilic reactions, which can react with water to form an ester unit in the polymer.

Examples of suitable nitriles include, but are not limited to: acetonitrile, adiponitrile, benzonitrile, n-butanenitrile, 2-ethyl-butanenitrile, 2-ethyl-4-methylpentanenitrile, 3-ethylpentanenitile, isobutyronitrile, 2-methylbutyronitrile, 2-methyl-glutaronitrile, 2-methyl-pentanenitrile, 3-methylbutanenitrile, 4-methylpentanenitrile, pentanenitrile, phenylacetonitrile, propiononitrile, 2-propylpentanenitrile, and blends thereof.

Esters

The transesterification of esters may be employed to prepare an ester unit in the polymer. Both acid- (e.g., sulfuric acid, hydrochloric acid) and base- (e.g., alkoxide ion) catalyzed transesterification methods are known in the art. Since transesterification is an equilibrium reaction, its equilibrium toward the desired product may be attained by removing one of the products from the reaction mixture.

Examples of acyclic esters include, but are not limited to: benzyl acetate, dimethyl terephthalate, ethyl acetate, ethyl benzoate, ethyl formate, ethyl phenyl acetate, ethyl stearate, isopentyl acetate, methyl acetate, pentyl acetate, phenyl acetate, propyl acetate, and blends thereof.

Cyclic Esters

In addition to acyclic esters, cyclic monoesters and/or cyclic diesters may be hydrolyzed to open the ring and react with a hydroxyl group to synthesize an ester unit in the polymer. In preferred embodiments, the ester also participates in its polymerization, grafting polyester units onto a hydroxyl group of the polymer. Anhydrous reactants are preferred for the ring opening/graft polymerization. Reactant drying can be accomplished using a vacuum oven or azeotropic distillation with an inert solvent (e.g., toluene, xylene derivatives or heptane, their blends, and/or derivatives) prior to the ring opening/graft polymerization.

Cyclic monoesters are also known as lactones, and include those that comprise (A) a 4-member ring (e.g., β-propiolactone, pivalolactone, β-butyrolactone), (B) a 5-member ring (e.g., γ-butyrolactone, γ-caprolactone, γ-valerolactone, γ-isocaprolactone), (c) a 6-member ring (e.g., δ-valerolactone, δ-tetradecanolactone), and (d) a 7-member ring (e.g., ε-caprolactone, ε-decalactone).

One class of cyclic esters that finds application is the dioxanone family, a 6-member ring that takes the general formula:

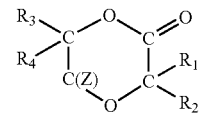

where $R_1$, $R_2$, $R_3$ and $R_4$ can be any of a variety of constituents, and where Z can be one or more constituents covalently bonded to the associated tetravalent carbon atom in the dioxane ring.

For example, a lactone results when all of $R_1$, $R_2$, $R_3$ and $R_4$ are hydrogen and Z is two hydrogen constituents. This compound is known as 1,4-dioxan-2-one (also called p-dioxan-2-one):

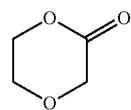

In addition to lactones, the ester unit of the polymer may be derived from cyclic diesters.

A preferred cyclic diester is 1,4-dioxan-2,5-dione, also known as glycolide:

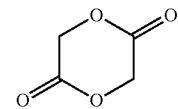

in which all of $R_1$, $R_2$, $R_3$ and $R_4$ are hydrogen and Z is an oxygen atom double bonded to the carbon.

Another important cyclic diester is 3,6-dimethyl-1,4-dioxane-2,5-dione, more commonly known as lactide, wherein $R_1$ and $R_3$ are hydrogen atoms, and $R_2$ and $R_4$ are methyl groups:

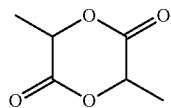

Lactide can exist as two optically active isomers, D-lactide and L-lactide, and as the optically inactive isomer meso-lactide. D-lactide and L-lactide can be present in equal quantities to form an optically inactive mixture known as racemic-lactide. Both meso-lactide and racemic-lactide are often designated as simply D,L-lactide. D,L-lactide used to be derived from petrochemicals, but it now it can be produced from plants, such as corn, from a fermentation process. This discovery makes D,L-lactide an important and cost-effective renewable resource. Used herein, the term lactide means any and all of these isomers and their mixtures.

Preferred cyclic esters include ε-caprolactone, glycolide and lactide, and blends thereof.

Reaction Solvent

The reactions of this invention can be performed with and without in a reaction solvent. If a solvent is desired, both water-soluble and water-insoluble reaction solvents may be used, and may be selected based on a number of considerations, such as, but not limited to the final product application. It is even possible to produce the polymer in multiple steps, wherein one type of solvent is used in one step, that solvent removed, and then replace with a different type of solvent.

The system used to deliver the polymer composition may comprise a reaction solvent, a blend of reaction solvents, or the reaction solvent(s) may be removed and a different solvent system used for further reaction and/or delivery.

Examples of reaction solvents include, but are not limited to:
(A) straight-chain, branched, or cyclic alcohols (e.g., n-butanol, tert-butanol, ethanol, methanol, 1-propanol, 2-propanol),
(B) straight-chain, branched, or cyclic difunctional, trifunctional or polyfunctional alcohols (e.g., ethylene glycol, glycerol propylene, glycol),
(c) homologues of ethylene oxide and propylene oxide units (e.g., diethylene glycol, triethylene glycol),
(d) glycol ethers (e.g., 2-butoxyethanol, 2-ethoxyethanol, 2-isopropoxyethanol, 2-methoxyethanol, and 2-propoxyethanol)
(e) straight-chain, branched, or cyclic alkanes (e.g., cyclohexane, isooctane, n-hexane, n-heptane),
(f) alkylbenzenes (e.g., benzene, ethylbenzene, toluene, xylene),
(g) monofunctional and difunctional (alkyl)benzenes (e.g., cresol, phenol, resorcinol),
(h) straight-chain, branched or cyclic aliphatic and aromatic ketones (e.g., acetone, acetophenone, cyclohexanone, methyl ethyl ketone,),
(i) water-soluble organic solvents (e.g., alcohols, dimethylformamide, dimethylacetamide, N-methylpyrrolidone, N-ethylpyrrolidone, dimethyl sulfoxide, furan, tetrahydrofuran),
(j) water-insoluble organic solvent (e.g., alkylbenzenes, straight-chain hydrocarbons, chlorinated hydrocarbons),
(j) natural or synthetic waxes, oils, fats, and emulsifiers which are liquid under the polymerization conditions, both per se and in a mixture with the abovementioned organic solvents or with water, and
(k) water.

In one embodiment of the invention, the described polymer finds use in oilfield applications, e.g., as an inhibitor of gas hydrates. Thus, the composition may present the polymer in a water-dispersible and/or water-soluble reaction solvents. Without being bound to specific theory, it is believed that water-dispersible and/or water-soluble solvents help to improve the effectiveness of the polymer by promoting a greater extension of polymer molecule in solution. In addition, such solvents may help to improve the solubility of the polymer in aqueous solution, and improve the compatibility of the composition at high injection temperature.

Examples of preferred water-dispersible and/or water-soluble reaction solvents include, but are not limited to: alcohols, lactams (N-methyl pyrrolidone), glycol ethers (e.g., 2-butoxyethanol, 2-ethoxyethanol, 2-isopropoxyethanol, 2-methoxyethanol, and 2-propoxyethanol), furans (e.g., furan, tetrahydrofuran), and blends thereof.

Highly preferred reactions and/or delivery solvents are ethanol and 2-propanol when the polymer is employed for gas hydrate inhibition.

An exemplary glycol ether is 2-butoxyethanol, which is highly preferred as a reaction solvent and/or delivery solvent.

In non-water based applications, there may be a preference for water insoluble reaction solvent(s) and/or delivery solvent(s). Solvents that are water insoluble include, but are not limited to: pure hydrocarbons, meaning those compounds consisting entirely of only carbon and hydrogen (e.g., benzene, cyclohexane, heptane, hexane, octane, toluene, and xylene), and impure hydrocarbons, meaning those compounds consisting of carbon, hydrogen, and other bonded atoms (e.g., chloroform, and dichloromethane).

In one embodiment of the invention, the reaction solvent also is employed for delivery. Less preferably, the polymer is produced in one solvent, that solvent removed, and then a preferred solvent or blends of preferred solvents added.

It is recognized that during the polymerization step (described below), an amount of the reaction solvent may be bonded covalently into the product, viz., incorporated into the polymer as a solvent adduct. Such a solvent adduct is possible with the described water-soluble reaction solvents. The existence of such an adduct can be provided by $^{13}C$ NMR studies.

Again not to be bounded by theory, it is also believed that the solvent adduct may impart surfactant-like properties to cause an extended polymer conformation in solution, which presumably exposes more of the polymer molecule to interact with the hydrate crystal lattice.

Polymerization and Grafting

Methods to produce the polymers are known to one skilled in the art, and include free radical polymerization, emulsion polymerization, ionic chain polymerization, and precipitation polymerization, the methods of which are known to one skilled in the art. Free radical polymerization is a preferred polymerization method, especially when using water-dispersible and/or water-soluble reaction solvent(s), and is described in "Decomposition Rate of Organic Free Radical Polymerization" by K. W. Dixon (section II in *Polymer Handbook*, volume 1, 4$^{th}$ edition, Wiley-Interscience, 1999), which is incorporated by reference.

Compounds capable of initiating the free-radical polymerization include those materials known to function in the prescribed manner, and include the peroxo and azo classes of materials. Exemplary peroxo and azo compounds include, but are not limited to: acetyl peroxide; azo bis-(2-amidinopropane) dihydrochloride; azo bis-isobutyronitrile; 2,2'-azo bis-(2-methylbutyronitrile); benzoyl peroxide; di-tert-amyl peroxide; di-tert-butyl diperphthalate; butyl peroctoate; tert-butyl dicumyl peroxide; tert-butyl hydroperoxide; tert-butyl perbenzoate; tert-butyl permaleate; tert-butyl perisobutylrate; tert-butyl peracetate; tert-butyl perpivalate; para-chlorobenzoyl peroxide; cumene hydroperoxide; diacetyl peroxide; dibenzoyl peroxide; dicumyl peroxide; didecanoyl peroxide; dilauroyl peroxide; diisopropyl peroxodicarbamate; dioctanoyl peroxide; lauroyl peroxide; octanoyl peroxide; succinyl peroxide; and bis-(ortho-toluoyl) peroxide.

Also suitable to initiate the free-radical polymerization are initiator mixtures or redox initiator systems, including: ascorbic acid/iron (II) sulfate/sodium peroxodisulfate, tert-butyl hydroperoxide/sodium disulfite, and tert-butyl hydroperoxide/sodium hydroxymethanesulfinate.

In one synthesis method, the described polymer is produced in two steps. The first step is a polymerization comprising at least one N-vinyl amide-based unit and/or at least one acrylamide-based unit, and at least one unit comprising a hydroxyl group and/or at least one group convertible to a hydroxyl group. The second step is polymerization of the polymer from step one and a unit to provide at least one ester unit in the final polymer product. By this method, it may be desirable to employ polar and/or aprotic solvent(s) (e.g., tetrahydrofuran, dimethylsulfoxide, dimethylformamide, or toluene) as the reaction solvent. Furthermore, it may be advantageous to remove the reaction solvent from the first step (e.g., ethanol) to achieve high product yield from the second step. Solvent removal may performed using a vacuum oven with an appropriate temperature setting. Alternatively, solvent removal can be performed using azeotropic distillation with an inert solvent, such as toluene, xylene derivatives or heptane derivatives, prior to the second step.

By an alternative synthesis method, the polymer is synthesized using a one-step technique. A one-step method may facilitate production ease, as the reactants (including initiator) can be charged into the reaction vessel in one campaign. It is preferred to include at least one unit that already comprises a hydroxyl group (as opposed to solely using functional groups convertible to a hydroxyl group) in order to avoid an additional reactive step. Furthermore, it is preferable to use a suitable, insert reaction solvent so that a change in reactive solvent is not required. As an illustration of this method, N-vinyl amide, hydroxyethyl methacrylate, and lactide can be charged into a reactor with tetrahydrofuran and tert-amyl peroxy-2-ethylhexanoate to synthesize poly(N-vinyl amide-co-hydroxyethyl methacrylate)-g-poly(lactic acid).

Composition and Use Levels

Polymers produced by this invention comprise, by weight:
from about 1% to about 99% of an N-vinyl amide unit and/or an acrylamide-based unit,
from about 1% to about 99% of a unit comprising at least one hydroxyl group and/or a unit comprising a functional group convertible to hydroxyl functionality, and
from about 1% to about 99% of an ester group.

More preferably, the polymers comprise:
from about 40% to about 99% of an N-vinyl amide unit and/or an acrylamide-based unit,
from about 1% to about 60% of a unit comprising at least one hydroxyl group and/or a unit comprising a functional group convertible to hydroxyl functionality, and
from 1% to about 60% of an ester group.

In especially preferred embodiments, the polymers produced by this invention comprise:
from about 70% to about 99% of an N-vinyl amide unit and/or an acrylamide-based unit,
from 1% to about 30% of a unit comprising at least one hydroxyl group and/or a unit comprising a functional group convertible to hydroxyl functionality, and
from 1% to about 30% of an ester group.

The aforementioned polymer compositions have a molecular weight of about 500 amu to about 5,000,000 atomic mass units (amu), as determined by gel permeation chromatography using polyethylene glycol standards. More preferably, the polymer molecular weight is from about 500 amu to about 100,000 amu.

When the polymers are employed as gas hydrate inhibitors, then any convenient concentration of inhibitor in the delivery solvent can be used, so long as it is effective in its purpose. Generally, the polymeric gas hydrate inhibitor is used in an amount of about 0.1% to about 3% by weight of the water present. The compositions also may include (without limitation) one or more biocides, corrosion inhibitors, emulsifiers, de-emulsifiers, defoamers, lubricants, and/or rheology modifiers.

It is contemplated that higher concentrations may be preferred in some applications. For example, at low application temperature high polymer concentrations may be needed to effectively inhibit gas hydrate formation and/or conduit blockage. Other applications may benefit from a reduced volume of concentrate solution, as it may simplify product handling and/or ease introduction into the petroleum fluid. Nonetheless, it is understood that the actual concentration will vary, depending upon many parameters like the specific application, selection of carrier solvent, the chemical composition of the inhibitor, the system temperature, and the inhibitor's solubility in the carrier solvent at application conditions. A suitable concentration for a particular application, however, can be determined by those skilled in the art by taking into account the inhibitor's performance under such application, the degree of inhibition required for the petroleum fluid, and the inhibitor's cost.

Product Characterization

The final product can be analyzed by known techniques to characterize the product. Especially preferred are the techniques of $^{13}$C nuclear magnetic resonance (NMR) spectroscopy, gas chromatography (GC), and gel permeation chromatography (GPC) in order to decipher polymer identity, residual monomer concentrations, polymer molecular weight, and polymer molecular weight distribution.

Nuclear magnetic resonance (NMR) spectroscopy is an especially preferred method to probe the polymerization product in terms of chemical properties such as monomeric composition, sequencing and tacticity. Analytical equipment suitable for these analyses include the Inova 400-MR NMR System by Varian Inc. (Palo Alto, Calif.). References broadly describing NMR include: Yoder, C. H. and Schaeffer Jr., C. D., *Introduction to Multinuclear NMR*, The Benjamin/Cummings Publishing Company, Inc., 1987; and Silverstein, R. M., et al., *Spectrometric Identification of Organic Compounds*, John Wiley & Sons, 1981, which are incorporated in their entirety by reference.

Residual monomer levels can be measured by GC, which can be used to indicate the extent of reactant conversion by the polymerization process. GC analytical equipment to perform these tests are commercially available, and include the following units: Series 5880, 5890, and 6890 GC-FID and GC-TCD by Agilent Technologies, Inc. (Santa Clara, Calif.). GC principles are described in *Modern Practice of Gas Chroma-* tography, third edition (John Wiley & Sons, 1995) by Robert L. Grob and Eugene F. Barry, which is hereby incorporated in its entirety by reference.

GPC is an analytical method that separates molecules based on their hydrodynamic volume (or size) in solution of the mobile phase, such as hydroalcoholic solutions with surfactants. GPC is a preferred method for measuring polymer molecular weight distributions. This technique can be performed on known analytical equipment sold for this purpose, and include the TDAmax™ Elevated Temperature GPC System and the RImax™ Conventional Calibration System by Viscotek™ Corp. (Houston, Tex.). In addition, GPC employs analytical standards as a reference, of which a plurality of narrow-distribution polyethylene glycol and polyethylene oxide standards representing a wide range in molecular weight is the preferred. These analytical standards are available for purchase from Rohm & Haas Company (Philadelphia, Pa.) and Varian Inc. (Palo Alto, Calif.). GPC is described in the following texts, which are hereby incorporated in their entirety by reference: Schroder, E., et al., *Polymer Characterization*, Hanser Publishers, 1989; Billingham, N.C., *Molar Mass Measurements in Polymer Science*, Halsted Press, 1979; and Billmeyer, F., *Textbook of Polymer Science*, Wiley Interscience, 1984.

The following, non-limiting examples are intended to illustrate the embodiments of the invention:

EXAMPLES

Example 1

Synthesis of poly(92.6% VCAP-co-4.9% HEMA)-g-(2.54% PLA)

Production of poly(95% VCAP-co-5% HEMA) in BGE with Initiator

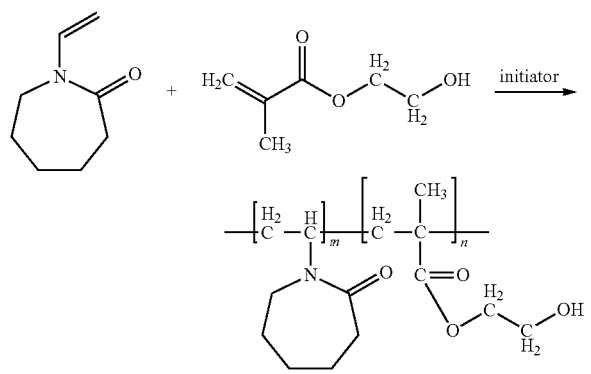

Preparation of feed solution #1: N-vinyl-2-caprolactam (VCAP) (9.5 g) and hydroxyethyl methacrylate (HEMA) (0.5 g) were codissolved in 2-butoxyethanol (BGE) (40 g).

Preparation of feed solution #2: N-vinyl-2-caprolactam (85.5 g) and hydroxyethyl methacrylate (4.5 g) were codissolved in 2-butoxyethanol (60 g).

Feed solution #1 was charged into the reaction kettle and heated to 116° C. under nitrogen purge. After reaching temperature, a tert-amyl peroxy-2-ethylhexanoate initiator, Trigonox® 121 (0.375 g), was added, and the mixture was stirred for 15 minutes.

Over a period of 3 hours, feed solution #2 was pumped into the reaction kettle containing feed solution #1, and, simultaneously, 13 charges of Trigonox® 121 (each 0.375 g) were added to the reactor every 15 minutes.

After the last charge of Trigonox® 121 the reaction kettle was cooled to 105° C., at which point additional Trigonox® 121 (0.375 g) was added into the reaction kettle. Thirty minutes later, a final charge of Trigonox® 121 (0.375 g) was added to the reaction kettle and the temperature was held for 1 hour.

Thereafter, the reaction kettle was allowed to cool to room temperature, and a brown, viscous polymer was discharged from the reaction kettle.

The polymer can assume alternating, block, and/or random configurations of the repeating units. The chemical structure subscripts m and n may be any integer equal to or greater than 1.

Grafting poly(lactide) onto poly(VCAP-co-HEMA)

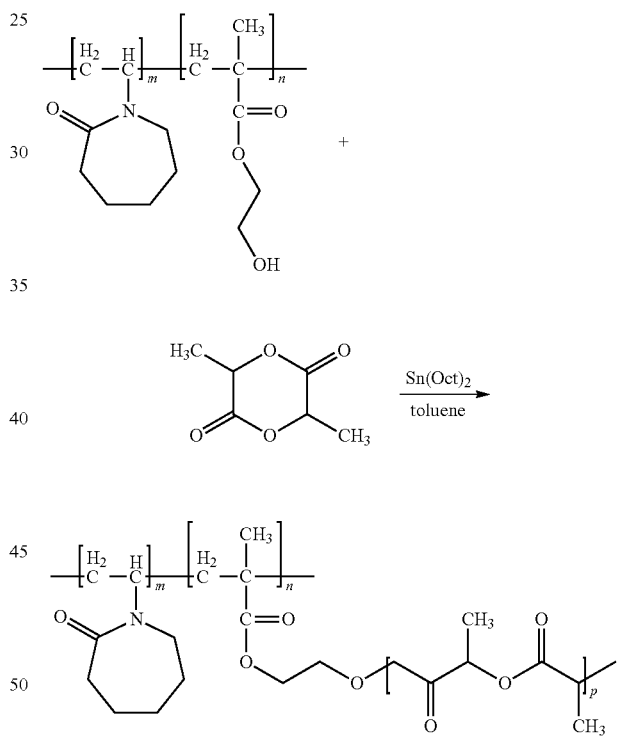

In a 250 mL three neck bottom flask equipped with a mechanical stirrer, reflux condenser, nitrogen inlet tube and thermowatch, the poly(VCAP-co-HEMA) product of Example 1 (50 g) and 1.28 g of 3,6-D,L-lactide were mixed.

Then, the initiator tin ethylhexanoate (0.02 g) was added, after which the reactor was heated to 110° C. under nitrogen purge and vigorous stirring.

The reactor was maintained under these conditions for 30 hours. Then, the reactor was cooled to room temperature, and a brown, viscous product was discharged from the reactor.

The polymer can assume alternating, block, and/or random configurations of the repeating units, with at least one ester group. The chemical structure subscripts m, n and p may be any integer equal to or greater than 1.

Example 2

Synthesis of poly(47% VCAP-co-11.6% VOH)-g-(40% PLA)

Production of poly(80% VCAP-co-20% VOH)

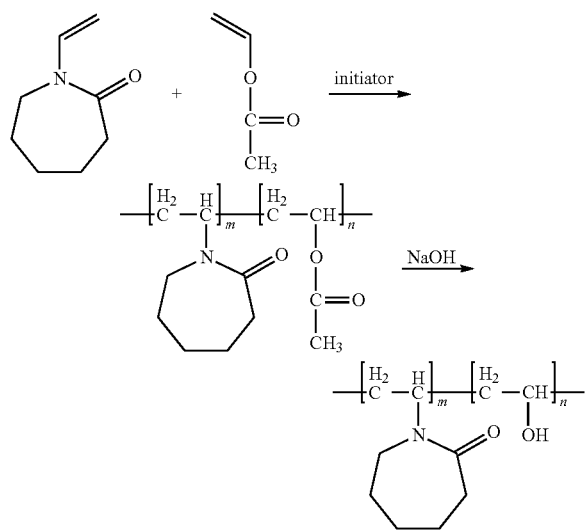

Preparation of feed solution #1: N-vinyl-2-caprolactam (168 g), and vinyl acetate (72 g) were dissolved in methanol (50 g).

Preparation of feed solution #2: Luperox® 11 M75 (21.6 g), a tert-butyl peroxypivalate initiator, was dissolved in methanol (50 g).

A 1-L stainless steel reactor was fitted with propeller agitator, reflux condenser, nitrogen inlet tube and thermocouple reactor. Methanol (250 g) was added, and then, under nitrogen purge, was heated to 80° C.

Then, all of feed solution #1 and a portion of feed solution #2 (60.8 g) were fed into the reactor over 180 minutes. After 15 minutes, the remainder of feed solution #2 was charged over 30 minutes.

After another one hour reaction, the reactor was cooled down to room temperature. The product obtained from the polymerization reaction was a brown, viscous copolymer of poly(VCAP-co-VAc) (70/30 mass ratio) in methanol at 40% solids.

The poly(VCAP-co-VAc) copolymer had a GPC molecular weight of 4,000 (polyethylene glycol standard).

In a three neck flask equipped with a condenser and a thermowatch, the poly(VCAP-co-VAc) product (i.e., polymer in reaction solvent) of this example (200 g) was mixed with a 20% NaOH solution (50 g).

The reactor was heated under nitrogen purge to 50° C.

After 4 hours of reaction, the reactor was cooled down to room temperature to discharge the products. The product is dried in air force oven to remove the solvent and then dissolved in tetrahydrofuran. After filtration to remove the sodium acetate, the product obtained was a light brown, viscous copolymer of poly(VCAP-co-VOH) (82/18 mass ratio) in a tetrahydrofuran.

The polymer can assume alternating, block, and/or random configurations of the repeating units. The chemical structure subscripts m and n may be any integer equal to or greater than 1.

Grafting poly(lactide) onto poly(VCAP-co-VOH)

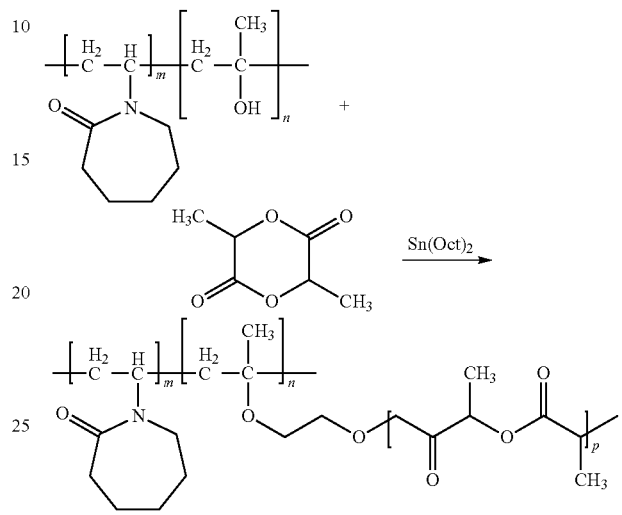

In a 250 mL three neck bottom flask equipped with a mechanical stirrer, reflux condenser, nitrogen inlet tube and thermowatch, 16 g poly(VCAP-co-VOH) dissolved in 150 g of tetrahydrofuran and 10 g of 3,6-D,L-lactide were mixed.

Then tin-ethylhexanoate initiator (0.14 g) dissolved in 0.72 g of toluene, was added, after which the reactor was heated to 62° C. under nitrogen purge and vigorous stirring.

The reactor was maintained under these conditions for 30 hours. Then, the reactor was cooled to room temperature, and a light brown, viscous product was discharged from the reactor.

The polymer can assume alternating, block, and/or random configurations of the repeating units, with at least one ester group. The chemical structure subscripts m, n and p may be any integer equal to or greater than 1.

While the invention has been described with particular reference to certain embodiments thereof, it will be understood that changes and modifications may be made which are within the skill of the art. Accordingly, it is intended to be bound only by the following claims:

What is claimed is:

1. A polymer derived at least from: (A) from about 1% to about 99% of at least one N-vinyl amide-based unit and/or at least one acrylamide-based unit, and (B) from about 11.6% to about 99% of at least one unit comprising:
   (i) at least one hydroxyl group, and/or
   (ii) at least one functional group convertible to a hydroxyl group wherein at least one group is converted to hydroxyl functionality in the final polymer product;
   wherein said polymer comprises from about 1% to about 99% of at least one ester group, and wherein said polymer is not poly(N-vinyl-2-pyrrolidone)-block-polyester copolymers or other diblock and triblock copolymer consisting of poly(N-vinyl-2-pyrrolidone) as one block.

2. The polymer of claim 1 wherein said N-vinyl amide-based unit is selected from the group consisting of: N-vinyl formamide, N-vinyl acetamide, N-(2,2-dichloro-vinyl)-propionamide, N-ethenyl acetamide, cis-N-propenyl acetamide, N-vinyl-N-methyl acetamide, N-vinyl-N,N-propyl propionamide, N-vinyl-2-pyrrolidone; N-vinyl piperidone; N-vinyl-2-caprolactam; N-vinyl-3-methyl pyrrolidone; N-vinyl-4-methyl pyrrolidone; N-vinyl-5-methyl pyrrolidone; N-vinyl-3-ethyl pyrrolidone; N-vinyl-3-butyl pyrrolidone; N-vinyl-3,3-dimethyl pyrrolidone; N-vinyl-4,5-dimethyl pyrrolidone; N-vinyl-5,5-dimethyl pyrrolidone; N-vinyl-3,3,5-trimethyl pyrrolidone; N-vinyl-5-methyl-5-ethyl pyrrolidone; N-vinyl-3,4,5-trimethyl-3-ethyl pyrrolidone; N-vinyl-6-methyl-2-piperidone; N-vinyl-6-ethyl-2-piperidone; N-vinyl-3,5-dimethyl-2-piperidone; N-vinyl-4,4-dimethyl-2-piperidone; N-vinyl-6-propyl-2-piperidone; N-vinyl-3-octyl piperidone; N-vinyl-7-methyl caprolactam; N-vinyl-7-ethyl caprolactam; N-vinyl-4-isopropyl caprolactam; N-vinyl-5-isopropyl caprolactam; N-vinyl-4-butyl caprolactam; N-vinyl-5-butyl caprolactam; N-vinyl-4-butyl caprolactam; N-vinyl-5-tert-butyl caprolactam; N-vinyl-4-octyl caprolactam; N-vinyl-5-tert-octyl caprolactam; N-vinyl-4-nonyl caprolactam; N-vinyl-5-tert-nonyl caprolactam; N-vinyl-3,7-dimethyl caprolactam; N-vinyl-3,5-dimethyl caprolactam; N-vinyl-4,6-dimethyl caprolactam; N-vinyl-3,5,7-trimethyl caprolactam; N-vinyl-2-methyl-4-isopropyl caprolactam; N-vinyl-5-isopropyl-7-methyl caprolactam; and blends thereof.

3. The polymer of claim 2 wherein said N-vinyl amide-based unit is selected from the group consisting of: N-vinyl-2-pyrrolidone, N-vinyl-2-caprolactam, and blends thereof.

4. The polymer of claim 1 wherein said acrylamide-based unit is selected from the group consisting of: acrylamide, N-butoxymethylacrylamide; N,N-dibutylacrylamide; N-butylacrylamide; diacetoneacrylamide; N—(N,N-dimethylamino)ethyl acrylamide; N,N-diethylacrylamide; N,N-dimethylacrylamide; N-dodecylmethacrylamide; N-ethylacrylamide; N-ethylmethacrylamide; N-isopropylacrylamide; N-isopropylmethacrylamide; β,β-N,N-tetramethylacrylamide; N-methylolacrylamide; N-methyl acrylamide; N-octadecylacrylamide; N-octylacrylamide; N-phenylacrylamide; trichloroacrylamide, N-acryloyl piperidone, N-acryloyl pyrrolidone, ethyl acryloyl pyrrolidone, methyl acryloyl pyrrolidone, N-acryloyl caprolactam, ethyl acryloyl caprolactam, methyl acryloyl caprolactam, N-cyclohexylacrylamide, N-cyclopentylacrylamide, and blends thereof.

5. The polymer of claim 1 wherein (B) is a polymerizable unit.

6. The polymer of claim 5 wherein said polymerizable unit is a hydroxyacrylate-based unit.

7. The polymer of claim 6 wherein said hydroxyacrylate-based unit is selected from the group consisting of: polyethylene glycol acrylate, polyethylene glycol methacrylate, 2-hydroxyethyl acrylate, hydroxyethyl ethacrylate, hydroxyethyl methacrylate, 3-hydroxypropyl methacrylate, 3-hydroxypropyl acrylate, and blends thereof.

8. The polymer of claim 5 wherein said polymerizable unit is selected from the group consisting of: (A) vinyl ester, (B) alkenyl halides, (c) vinyl carboxylic acids, (d) vinyl ketones, (e) vinyl aldehydes, (f) epoxides, and blends thereof.

9. The polymer of claim 8 wherein said polymerizable unit is selected from the group consisting of: 2-acetoxy-2-butene; 2-acetoxy-3-methyl-2-butene; ethyl vinyl acetate; isopropenyl acetate; methyl vinyl acetate; (pent-2-en-3-yl)acetate; vinyl acetate; vinyl hexanoate; vinyl octanoate; vinyl propionate; vinyl N-valerate; 1-chloro-1-butene; 1-chloro-2-butene; 3-chlorocrotonic acid; 3-chloro-methacrylic acid; 1-chloro-2-pentene; 2-chloro-2-butene; 2-chloro-3-methyl-butene; 2-chloro-3-hexene; 2-chloro-2-pentene; 4-chloro-prop-3-en-2-one; 1,2-dichloroethylene; trichloroethylene; vinyl chloride; vinylidene chloride, and their bromine and iodine analogues; acrylic acid; 2-butenoic acid; cinnamic acid; 2,3-dimethylacrylic acid; 3,3-dimethylacrylic acid; 2,3-dimethyl-2-butenoic acid; 2-ethylacrylic acid; 2-ethyl-2-butenoic acid; fumaric acid; methacrylic acid; 2-pentenoic acid; 4-pentenoic acid; ethyl vinyl ketone; 2-hepten-4-one; hex-3-ene-2-one; 4-hexen-3-one; 3-methyl-3-penten-2-one; 4-methyl-3-penten-2-one; 5-methyl-1-hexen-3-one; methyl vinyl ketone; 3-penten-2-one; propyl vinyl ketone; but-2-enal; 2-butenedial; 3-butyn-1-al; cinnamic aldehyde; 2-methyl-2-butenal; 2-methylene butyraldehyde; 2-methyl-2-pentenal; 2-methyl-2-propenal; 3-methylbut-2-enal; 2-pentenedial; prop-2-enal; 1,2-epoxybutane; 2,3-epoxybutane; ethylene oxide; propylene oxide; isobutylene oxide; and blends thereof.

10. The polymer of claim 5 wherein said polymerizable unit is selected from the group consisting of: hydroxyethyl methacrylate, polyethylene glycol methacrylate, vinyl acetate, and blends thereof.

11. The polymer of claim 1 wherein said element (B) is a solvent adduct.

12. The polymer of claim 1 wherein said ester group is derived from the group consisting of: acyl chlorides, acid anhydrides, carboxylic acids, nitriles, esters, and blends thereof.

13. The polymer of claim 12 wherein said ester group is derived from the group consisting of: acetyl chloride; benzoyl chloride, butyryl chloride; diethyl acetyl chloride; ethanolyl chloride; isobutyryl chloride; 2-methyl butanoyl chloride; 2-methyl pentanoyl chloride; propanoyl chloride; stearoyl chloride; acetic anhydride; ethanoic anhydride; glutaric anhydride; phthalic anhydride; propanoic anhydride; succinic anhydride; acrylic acid; ethanoic acid; 2-ethylbutanoic acid; 2-ethylpantanoic acid glycolic acid; lactide acid; methanoic acid; 2-methylbutanoic acid; propanoic acid; acetonitrile; adiponitrile; benzonitrile; n-butanenitrile; 2-ethyl-butanenitrile; 2-ethyl-4-methylpentanenitrile; 3-ethylpentanenitrile; isobutyronitrile; 2-methylbutyronitrile; 2-methyl-glutaronitrile; 2-methyl-pentanenitrile; 3-methylbutanenitrile; 4-methylpentanenitrile; pentanenitrile; phenylacetonitrile; propiononitrile; 2-propylpentanenitrile; benzyl acetate; dimethyl terephthalate; ethyl acetate; ethyl benzoate; ethyl formate; ethyl phenyl acetate; ethyl stearate; isopentyl acetate; methyl acetate; pentyl acetate; phenyl acetate; propyl acetate; β-propiolactone; pivalolactone; β-butyrolactone; γ-butyrolactone; γ-valerolactone; γ-isocaprolactone; δ-valerolactone; δ-tetradecanolactone; ε-caprolactone; and ε-decalactone; glycolide; lactide; lactone; and blends thereof.

14. The polymer of claim 1 that is derived in part from at least one of the following (A) units: N-vinyl-2-caprolactam or N-vinyl-2-pyrrolidone; and also is derived in part from at least one of the following (B) units: hydroxyethyl methacrylate, hydroxyethyl acrylate, polyethylene glycol methacrylate or vinyl acetate that subsequently is partially or completely hydrolyzed; and wherein said ester unit is derived from at least: glycolic acid, glycolide, lactide, lactide acid, or ε-caprolactone.

15. The polymer of claim 14 selected from the group consisting of poly(N-vinyl-2-caprolactam-co-hydroxyethyl methacrylate)-g-poly(glycolide); poly(N-vinyl-2-caprolactam-co-hydroxyethyl methacrylate)-g-poly(lactide); poly(N-vinyl-2-caprolactam-co-hydroxyethyl methacrylate)-g-poly(lactic acid); poly(N-vinyl-2-caprolactam-co-hydroxyethyl methacrylate)-g-poly(ε-caprolactone); poly(N-vinyl-2-caprolactam-co-hydroxyethyl acrylate)-g-poly(glycolide); poly(N-vinyl-2-caprolactam-co-hydroxyethyl acrylate)-g- poly(lactide); poly(N-vinyl-2-caprolactam-co-hydroxyethyl acrylate)-g-poly(lactic acid); poly(N-vinyl-2-caprolactam-co-hydroxyethyl acrylate)-g-poly(ε-caprolactone); poly(N-vinyl-2-caprolactam-co-polyethylene glycol methacrylate)-g-poly(glycolide); poly(N-vinyl-2-caprolactam-co-polyethylene glycol methacrylate)-g-poly(lactide); poly(N-vinyl-2-caprolactam-co-polyethylene glycol methacrylate)-g-poly(lactic acid); poly(N-vinyl-2-caprolactam-co-polyethylene glycol methacrylate)-g-poly(ε-caprolactone); poly(N-vinyl-2-caprolactam-co-vinyl alcohol)-g-poly(glycolide); poly(N-vinyl-2-caprolactam-co-vinyl alcohol)-g-poly(lactide); poly(N-vinyl-2-caprolactam-co-vinyl alcohol)-g-poly(lactic acid); poly(N-vinyl-2-caprolactam-co-vinyl alcohol)-g-poly(ε-caprolactone); poly(N-vinyl-2-pyrrolidone-co-hydroxyethyl methacrylate)-g-poly(glycolide); poly(N-vinyl-2-pyrrolidone-co-hydroxyethyl methacrylate)-g-poly(lactide); poly(N-vinyl-2-pyrrolidone-co-hydroxyethyl methacrylate)-g-poly(lactic acid); poly(N-vinyl-2-pyrrolidone-co-hydroxyethyl methacrylate)-g-poly(ε-caprolactone); poly(N-vinyl-2-pyrrolidone-co-hydroxyethyl acrylate)-g-poly(glycolide); poly(N-vinyl-2-pyrrolidone-co-hydroxyethyl acrylate)-g-poly(lactide); poly(N-vinyl-2-pyrrolidone-co-hydroxyethyl acrylate)-g-poly(lactic acid); poly(N-vinyl-2-pyrrolidone-co-hydroxyethyl acrylate)-g-poly(ε-caprolactone); poly(N-vinyl-2-pyrrolidone-co-polyethylene glycol methacrylate)-g-poly(glycolide); poly(N-vinyl-2-pyrrolidone-co-polyethylene glycol methacrylate)-g-poly(lactide); poly(N-vinyl-2-pyrrolidone-co-polyethylene glycol methacrylate)-g-poly(lactic acid); poly(N-vinyl-2-pyrrolidone-co-polyethylene glycol methacrylate)-g-poly(ε-caprolactone); poly(N-vinyl-2-pyrrolidone-co-vinyl alcohol)-g-poly(glycolide); poly(N-vinyl-2-pyrrolidone-co-vinyl alcohol)-g-poly(lactide); poly(N-vinyl-2-pyrrolidone-co-vinyl alcohol)-g-poly(lactic acid); or poly(N-vinyl-2-pyrrolidone-co-vinyl alcohol)-g-poly(ε-caprolactone).

16. The polymer of claim 1 wherein said polymer has a molecular weight from about 500 amu to about 5,000,000 amu.

17. The polymer of claim 1 that is degradable by biological, chemical and/or other mechanisms.

18. A composition comprising a polymer derived at least from (A) from about 1% to about 99% of at least one N-vinyl amide-based unit and/or at least one acrylamide-based unit, and (B) from about 11.6% to about 99% of at least one unit comprising:
 (iii) at least one hydroxyl group, and/or
 (iv) at least one functional group convertible to a hydroxyl group wherein at least one group is converted to hydroxyl functionality in the final polymer product;
wherein said polymer comprises from about 1% to about 99% of at least one ester group, and wherein said polymer is not poly(N-vinyl-2-pyrrolidone)-block-polyester copolymers or other diblock and triblock copolymer consisting of poly(N-vinyl-2-pyrrolidone) as one block in adhesive, agriculture, cleaning, coating, dental, encapsulation, imaging, household/industrial/institutional, medical, membrane, oilfield, oral care, packaging, personal care, pharmaceutical, printing, or veterinary applications.

19. A composition that comprises the polymer of claim 1.

20. The composition of claim 19 that is an adhesive, agriculture, cleaning, coating, dental, encapsulation, imaging, household/industrial/institutional, medical, membrane, oilfield, oral care, packaging, personal care, pharmaceutical, printing, or veterinary composition.

21. The composition of claim 19 that further comprises a solvent selected from the group consisting of: an alcohol, homologues of ethylene oxide and/or propylene oxide units, a glycol ether, an alkane, an alkylbenzene, an (alkyl)benzene, a ketone, a wax, a fat, an emulsifier, water, and blends thereof.

22. The composition of claim 21 wherein said solvent is selected from the group consisting of: 1-butanol, 2-butanol, ethanol, ethylene glycol, methanol, 1-propanol, 2-propanol, propylene glycol, 2-butoxyethanol, 2-ethoxyethanol, 2-isopropoxyethanol, 2-methoxyethanol, 2-propoxyethanol, and blends thereof.

23. The composition of claim 21 wherein said solvent is water dispersible and/or water soluble.

24. The composition of claim 21 wherein said solvent is water insoluble.

25. The composition of claim 20 used in oilfield applications.

26. The composition of claim 25 that further comprises an ingredient selected from the group consisting of: biocides, corrosion inhibitors, emulsifiers, de-emulsifiers, defoamers, lubricants, rheology modifiers, shale swelling inhibitors, and blends thereof.

27. A method for preventing, retarding, and/or reducing the formation and/or growth of gas hydrates that comprises:
 (I) selecting a polymer derived from:
  (A) from about 1% to about 99% of at least one N-vinyl amide-based unit and/or at least one acrylamide-based unit, and
  (B) from about 11.6% to about 99% of at least one unit comprising:
   (i) at least one hydroxyl group, and/or
   (ii) at least one functional group convertible to a hydroxyl group wherein at least one group is converted to hydroxyl functionality in the final polymer product;
  wherein said polymer comprises from about 1% to about 99% of at least one ester group, and wherein said polymer is not poly(N-vinyl-2-pyrrolidone)-block-polyester copolymers or other diblock and triblock copolymer consisting of poly(N-vinyl-2-pyrrolidone) as one block; and
 (II) introducing a composition comprising said polymer into a petroleum-containing fluid from about 0.01% to about 3% by weight of the water present in the fluid being treated.

* * * * *